(12) United States Patent
Malik et al.

(10) Patent No.: US 8,411,396 B2
(45) Date of Patent: Apr. 2, 2013

(54) PREVENTING METAL OXIDE VARISTOR (MOV) FROM RELEASING SMOKE, SMELL, AND/OR SOUND

(75) Inventors: Randhir S. Malik, Cary, NC (US); James L. Adams, Jr., Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 715 days.

(21) Appl. No.: 12/615,008

(22) Filed: Nov. 9, 2009

(65) Prior Publication Data

US 2011/0110128 A1 May 12, 2011

(51) Int. Cl.
*H01G 2/12* (2006.01)

(52) U.S. Cl. .................... 361/15; 361/91.3; 363/53

(58) Field of Classification Search .................... 361/15, 361/89, 91.1, 91.3; 363/52, 53, 125, 126
See application file for complete search history.

(56) References Cited

U.S. PATENT DOCUMENTS

| | | | |
|---|---|---|---|
| 4,739,436 A | 4/1988 | Stefani et al. | |
| 4,903,161 A | 2/1990 | Huber et al. | |
| 5,488,534 A | 1/1996 | Rau et al. | |
| 5,999,391 A | 12/1999 | Lou et al. | |
| 6,011,682 A | 1/2000 | Storey | |
| 6,549,388 B2 | 4/2003 | Robinson | |
| 6,560,086 B2 | 5/2003 | Mechanic | |
| 7,023,680 B1 | 4/2006 | Johnson et al. | |
| 7,262,945 B2 | 8/2007 | Galang et al. | |
| 7,453,368 B2 * | 11/2008 | Baldwin | 340/659 |
| 7,561,388 B2 * | 7/2009 | Sung et al. | 361/42 |
| 7,961,111 B2 * | 6/2011 | Tinaphong et al. | 340/638 |
| 2006/0146464 A1 | 7/2006 | Tan et al. | |
| 2010/0128404 A1 * | 5/2010 | Gass et al. | 361/91.1 |
| 2011/0110128 A1 * | 5/2011 | Malik et al. | 363/52 |

FOREIGN PATENT DOCUMENTS

JP 07039136 A 2/1995

* cited by examiner

*Primary Examiner* — Jeffrey Sterrett
(74) *Attorney, Agent, or Firm* — Steven L. Bennett

(57) ABSTRACT

A system includes an electrical component, a MOV, a voltage sensor, and a circuit. The MOV is connected in parallel to the electrical component. The voltage sensor detects a voltage over the MOV and the electrical component. The circuit removes power in response to the voltage sensor detecting the voltage over the MOV and the electrical component being greater than a threshold voltage for a length of time greater than a threshold length of time. Removing power prevents the MOV from releasing one or more of smoke, smell, and sound. The MOV is thus not damaged as a result of a power surge. The system may be a power supply, or another type of electrical system. The electrical component may be a capacitor, or another type of electrical component.

18 Claims, 3 Drawing Sheets

US 8,411,396 B2

PREVENTING METAL OXIDE VARISTOR (MOV) FROM RELEASING SMOKE, SMELL, AND/OR SOUND

FIELD OF THE INVENTION

The present invention relates generally to systems, such as power supplies, which include metal oxide varistors (MOVs), and more particularly to preventing the MOVs from releasing smoke, smell, and/or sound.

BACKGROUND OF THE INVENTION

Electrical systems, such as power supplies, can be susceptible to power surges originating from the alternating current (AC) mains to which they are connected, typically via a plug plugged into a wall outlet, as well as from other sources. A power surge is generally an undesired increase in voltage that typically lasts for a relatively brief length of time, generally on the order of a few microseconds. A power surge can damage the internal components of electrical systems. Therefore, electrical systems like power supplies can include metal oxide varistors (MOVs) to protect their internal components from power surges, so that the components are not damaged when power surges occur.

SUMMARY OF THE INVENTION

An alternating current-to-direct current (AC-to-DC) power supply of an embodiment of the invention includes a circuit segment, a transformer, a metal oxide varistor (MOV), a voltage sensor, and a circuit. The circuit segment includes a first capacitor and a second capacitor connected in series to receive a rectified AC voltage over the circuit segment. The transformer has a first coil and a second coil. The first coil is connected in parallel to the circuit segment. The second coil provides a stepped-down voltage from the rectified AC voltage. The stepped-down voltage is rectified and filtered to provide a DC output voltage of the AC-to-DC power supply. The MOV is connected in parallel to the first capacitor. The voltage sensor detects a DC voltage over the MOV and the first capacitor. The circuit removes power, such as by opening an AC line fuse, in response to the voltage sensor detecting the DC voltage over the MOV and the first capacitor being greater than a threshold DC voltage for a length of time greater than a threshold length of time. The AC line fuse can be substituted by a resettable circuit breaker. Removing power prevents the MOV from releasing one or more of smoke, smell, and sound.

A system of an embodiment of the invention includes an electrical component, a MOV, a voltage sensor, and a circuit. The MOV is connected in parallel to the electrical component. The voltage sensor detects a voltage over the MOV and the electrical component. The circuit removes power in response to the voltage sensor detecting the voltage over the MOV and the electrical component being greater than a threshold voltage for a length of time greater than a threshold length of time. Removing power prevents the MOV from releasing one or more of smoke, smell, and sound.

A method of an embodiment of the invention provides an AC-to-DC power supply. The power supply includes a circuit segment, a transformer, and a MOV. The circuit segment includes a first capacitor and a second capacitor connected in series to receive a rectified AC voltage over the circuit segment. The transformer has a first coil and a second coil. The first coil connected in parallel to the circuit segment. The second coil provides a stepped-down voltage from the rectified AC voltage. The stepped-down voltage is rectified and filtered to provide a DC output voltage of the AC-to-DC power supply. The MOV is connected in parallel to the first capacitor. The method further provides a voltage sensor and a circuit. The voltage sensor detects a DC voltage over the MOV and the first capacitor. The circuit removes power in response to the voltage sensor detecting the DC voltage over the MOV and the first capacitor being greater than a threshold DC voltage for a length of time greater than a threshold length of time. Removing power prevents the MOV from releasing one or more of smoke, smell, and sound.

BRIEF DESCRIPTION OF SEVERAL VIEWS OF THE DRAWINGS

The drawings referenced herein form a part of the specification. Features shown in the drawing are meant as illustrative of only some exemplary embodiments of the invention, and not of all embodiments of the invention, unless otherwise explicitly indicated, and implications to the contrary are otherwise not to be made.

DETAILED DESCRIPTION

Figure 1:
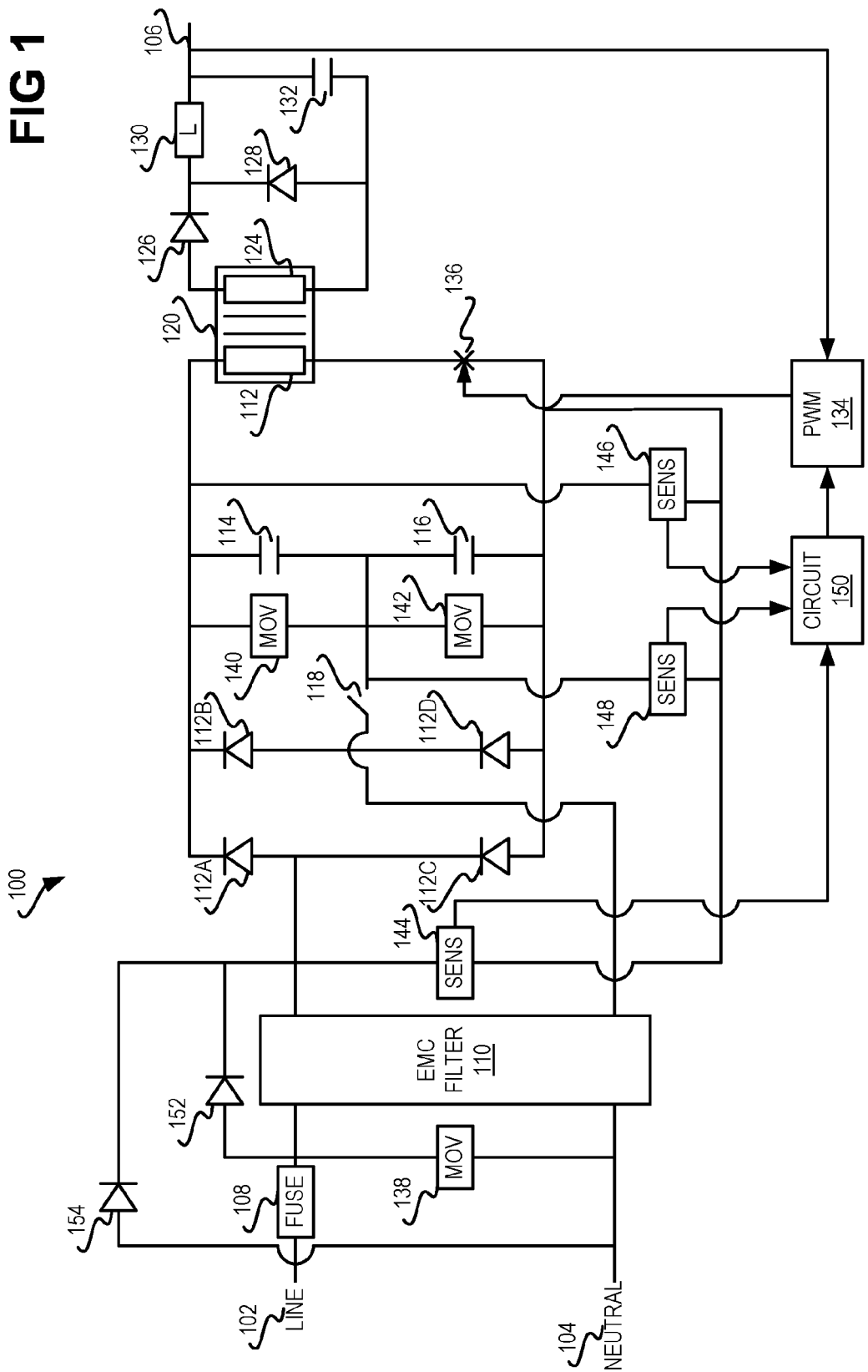
FIG. 1 is a diagram of an alternating current-to-direct current (AC-to-DC) power supply, according to an embodiment of the present invention.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, electrical systems such as power supplies can include metal oxide varistors (MOVs) to protect their internal components from power surges, so that the components are not damaged when power surges occur. As also noted in the background section, a power surge is generally an undesired increase in voltage that typically lasts for a relatively brief length of time, generally on the order of a few microseconds. However, power surges can last for longer periods of time, ranging from tens of milliseconds to a few seconds, if not longer.

Such relatively long power surges can create problems. In particular, the MOVs are required to dissipate excessive power to protect the internal components of electrical systems. As such, if the power surges last longer than the rated times of the MOVs, the MOVs can start smoking, emitting toxic fumes (i.e., smells), and/or emitting annoying noises (i.e., sound). Ultimately, the MOVs themselves may become damaged, requiring that they be replaced with new MOVs so that the internal components of electrical systems remain protected during subsequent power surges.

The inventors have developed an innovative approach to prevent MOVs from releasing smoke, smell, and/or sound during relatively long power surges. In particular, a voltage sensor detects a voltage over the MOV. If the voltage over the MOV is greater than a threshold voltage for a length of time greater than a threshold length of time, power is removed to prevent the MOV from releasing smoke, smell, and/or sound. The MOV is not damaged, and therefore does not have to be replaced to continue protecting a given internal component of a given electrical system.

The following description of embodiments of the invention is particular to an alternating current-to-direct current (AC-to-DC) power supply having a capacitor and a MOV connected in parallel to one another. The voltage over the capacitor and the MOV are monitored to determine whether to remove power to prevent the MOV from releasing smoke, smell, and/or sound. However, more generally, other embodiments of the invention relate to any type of electrical system, of which an AC-to-DC power supply is just one example. Such an electrical system can include an electrical component other than a capacitor.

FIG. 1 shows an AC-to-DC power supply 100, according to an embodiment of the invention. The power supply 100 receives AC power on line and neutral inputs 102 and 104, respectively, from AC mains, such as by plugging the power supply 100 into a wall outlet. The line and neutral inputs 102 and 104 together form an AC input of the power supply 100. The power supply 100 generates DC power on a DC power output 106. For example, the power supply 100 may convert 110-120 or 220-240 AC volts to 12 DC volts in one embodiment. In one embodiment, inputs 102 and 104 can be connected to two different AC mains to achieve 205 AC voltage input.

A fuse 108 is connected to the line input 102 and protects the power supply 100 from excessive AC voltage, by tripping. An electromagnetic compatibility (EMC) filter 110 filters the AC voltage provided on the line and the neutral inputs 102 and 104. A rectifier made up of diodes 112A, 112B, 112C, and 112D, collectively referred to as the diodes 112, rectifies the AC voltage after having been filtered to provide a DC voltage over a circuit segment including capacitors 114 and 116 connected in series with one another. Where the AC voltage provided on the line and the neutral inputs 102 and 104 is low (e.g., between 110-120 AC volts), a switch 118 is closed, so that the DC voltage over the capacitors 114 and 116 is doubled. By comparison, where the AC voltage provided on the line and the neutral inputs 102 and 104 is high (e.g., between 220-240 AC volts), the switch 118 is opened, so that the DC voltage over the capacitors 114 and 116 is not doubled. In this way, the DC voltage over the capacitors 114 and 116 can be the same, regardless of whether the AC voltage provided on the line and neutral inputs 102 and 104 is high or low.

The power supply 100 includes a transformer 120 having a first coil 122 and a second coil 124. The first coil 122 is connected in parallel to the circuit segment including the capacitors 114 and 116. The second coil 124 provides a stepped-down voltage from the rectified AC voltage over the capacitors 114 and 116 and over the first coil 122. For example, the rectified AC voltage may be 400 DC volts, whereas the stepped-down voltage may be 12 DC volts. A diode 126 and an inductor 130 are connected in series to the second coil 124. A capacitor 132 is connected to the inductor 130 and the second coil 124, and another diode 128 is connected between the diode 126 and the inductor 130, and is also connected to the second coil 124. The diodes 126 and 128 rectify the stepped-down voltage provided by the second coil 124, and the inductor 130 and the capacitor 132 filter this voltage to generate the DC voltage at the DC power output 106.

A transistor 136 is connected to the first coil 122. In normal operation, the transistor 126 is opened and closed in a pulse width modulated manner, by a pulse width modulator (PWM) 134. The PWM 134 receives as an input feedback signal, which can be referred to as a control signal, from the DC voltage at the DC power output 106. In normal operation, when this DC voltage is lower than the desired DC voltage to be output by the power supply 100, the PWM 134 outputs a pulse-width modulated signal at a higher duty ratio. By comparison, in normal operation, when the DC voltage is greater than the desired DC voltage to be output, the PWM 134 outputs a pulse-width modulated control signal at a lower duty ratio. Therefore, in normal operation, the transistor 126 is opened and closed in accordance with a normal pulse width duty ratio of the pulse-width modulated signal output by the PWM 134.

The power supply 100 includes three MOVs 138, 140, and 142. The MOV 138 is connected in parallel to the AC power provided at the line inputs 102 and 104, between the line input 102 (after the fuse 108) and the neutral input 104, to protect the power supply 100 against power surges in the AC power that are insufficient to trip (i.e., clear) the fuse 108. However, if a power surge is at a great enough voltage (but still not sufficient to trip the fuse 108) for a long enough period of time, the MOV 138 can begin to emit smoke, smell, or sound, indicating that the MOV 138 will become damaged in short order or create a failure of a power supply component.

The MOV 140 is connected in parallel to the capacitor 114, whereas the MOV 142 is connected in parallel to the capacitor 116. Ideally, the voltage across the capacitor 114 is equal to the voltage across the capacitor 116. However, the capacitors 114 and 116 can wear out at different rates, such as by drying out of their electrolytes at different rates in the case where the capacitors 114 and 116 are electrolytic capacitors. In this situation, the voltage across the capacitor 114 is not equal to the voltage across the capacitor 116. The result can be that the voltage across one of the capacitors 114 and 116 is greater than the voltage rating of this capacitor, which may be 200 volts, for instance. The corresponding MOV 140 or 142 prevents this capacitor from being damaged due to venting. However, if the voltage over this corresponding MOV 140 or 142 is great enough for a long enough period of time, it can begin to emit smoke, smell, or sound, indicating that the MOV will become damaged in short order.

The MOVs 140 and 142 protect the capacitors 114 and 116 in another situation as well. The specified AC voltage at the line and the neutral inputs 102 and 104 may be low, such as between 110-120 volts. Therefore, the switch 118 is closed, to double the voltage over the capacitors 114 and 116 so that it is equal to the voltage over the capacitors 114 and 116 if the switch 118 were open and the specified AC voltage were high, such as between 220-240 volts. In certain situations, the input voltage is 220-240V and the switch 118 is closed by mistake, however, and the high input voltage applied over the capacitors 114 and 116 is still doubled, which can cause the MOVs 140 and 142 to begin emitting smoke, smell, or sound, and become damaged.

To prevent the MOVs 138, 140, and 142 from emitting smoke, smell, and/or sound, and from becoming damaged, the power supply 100 includes sensors 144, 146, and 148, and a circuit 150. The sensor 144 detects the peak of the AC voltage as rectified by diodes 152 and 154 over the MOV 138. The sensor 146 detects the DC voltage over the MOV 140 and the capacitor 114. The sensor 148 similarly detects the DC voltage over the MOV 142 and the capacitor 116.

The circuit 150 determines whether the (rectified) AC voltage over the MOV 138, as detected by the sensor 144, is greater than a threshold (rectified) AC voltage for a length of time greater than a threshold length of time. The circuit 150 determines whether the DC voltage over the MOV 140 and over the capacitor 114, as detected by the sensor 146, is greater than a threshold DC voltage for a length of time greater than the same or a different threshold length of time. Likewise, the circuit 150 determines whether the DC voltage over the MOV 142 and over the capacitor 116, as detected by the sensor 148, is greater than the threshold DC voltage for a length of time greater than the same or a different threshold length of time. The threshold lengths of time are selected to be less than the lengths of time that result in the MOVs 138, 140, and 142 releasing smoke, smell, and/or sound.

In response to any of the voltages detected by any of the sensors 144, 146, and 148 being greater than their corresponding threshold voltages for lengths of time greater than their corresponding threshold lengths of time, the circuit 150 removes power by turning on the transistor 136 to either open the input fuse 108 or saturate the transformer to prevent the MOVs 138, 140, and/or 142 from releasing smoke, smell, and/or sound. As such, the MOVs 138, 140, and/or 142 are not damaged. The circuit 150 particularly can remove power from just the electrical component in question, such as one of the capacitors 114 or 116, or from the entire power supply 100.

In the embodiment of FIG. 1, the circuit 150 removes power by controlling the PWM 134 to turn the transistor 136 on for at least a predetermined length of time, overriding the normal responsiveness of the PWM 134 to the feedback signal at the DC power output 106. The transistor 136 is particularly turned on for a sufficient length of time to remove excess power from at least the capacitors 114 and 116 of the power supply 100. During this length of time, there is no excessive voltage over the capacitors 114 and 116, such that the MOVs 140 and 142 are not dissipating the excess power resulting from either of the capacitors 114 and 116 exceeding their voltage rating. Therefore, the MOVs 140 and 142 cannot become damaged. While the voltage at the DC power output 106 may momentarily dip due to saturation of the transformer for this period, the predetermined length of time is desirably such that the dip is not too great.

Figure 2:
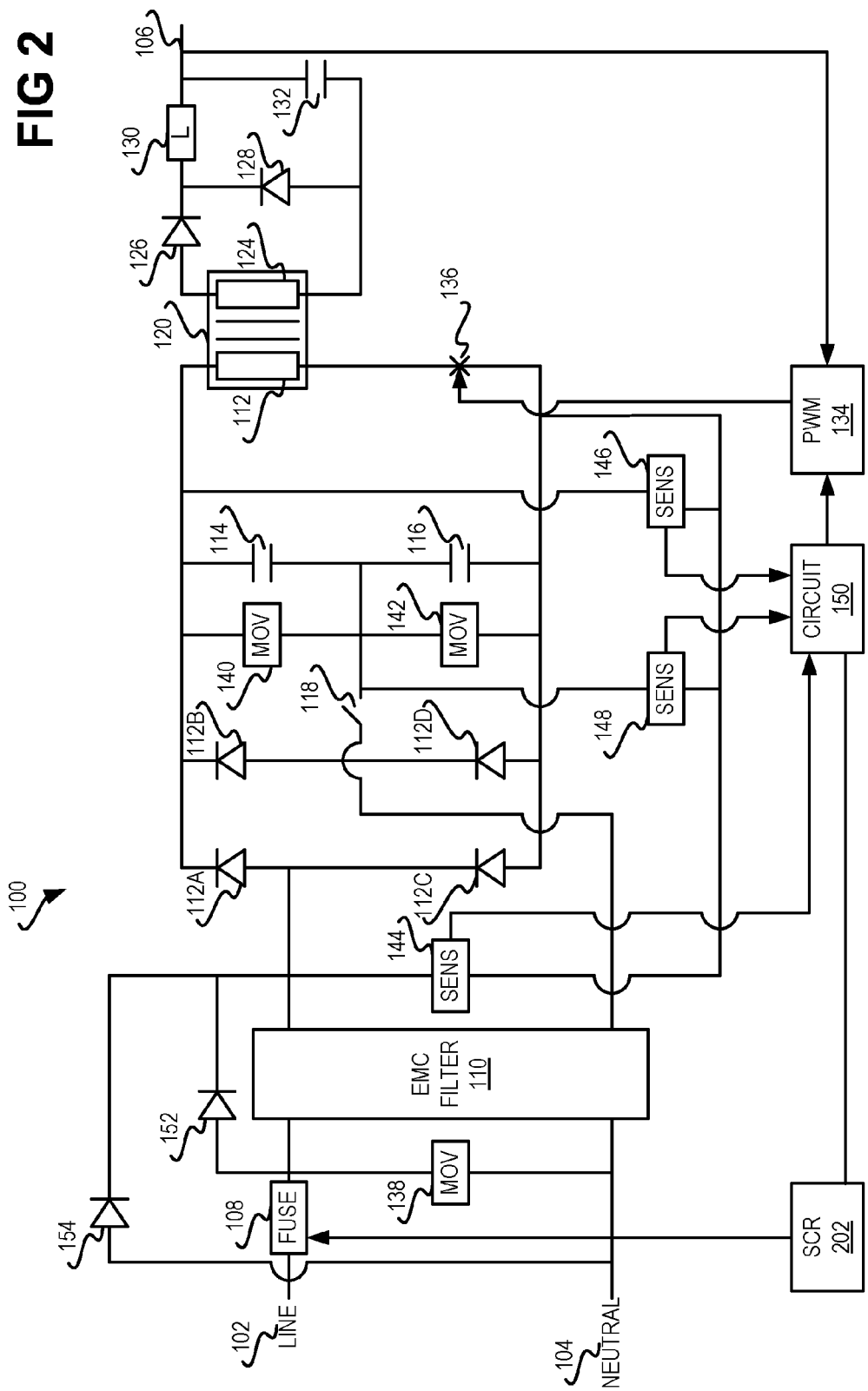
FIG. 2 is a diagram of an AC-to-DC power supply, according to another embodiment of the present invention.

FIG. 2 shows the AC-to-DC power supply 100, according to another embodiment of the invention. The embodiment of FIG. 2 can be used in conjunction with or in lieu of the embodiment of FIG. 1. The power supply 100 generates a DC voltage at the DC power output 106 from the AC voltage present at the line and neutral inputs 102 and 104 in the embodiment of FIG. 2 in the same way in which the power supply 100 generates the DC voltage from the AC voltage in the embodiment of FIG. 1.

The difference between the embodiments of FIGS. 1 and 2 are as follows. In FIG. 1, the circuit 150 controls the PWM 134 to turn on the transistor 136, overriding the feedback signal from the DC power output 106, to remove power from the capacitors 114 and 116 and from the MOVs 140 and 142. As such, the embodiment of FIG. 1 is not as useful when the sensor 144 senses that there is a (rectified) AC voltage greater than a (rectified) AC voltage threshold over the MOV 138. That is, the primary utility of the embodiment of FIG. 1 is when the sensor 146 or 148 senses that there is a DC voltage greater than a DC voltage threshold over the MOV 140 or 142.

By comparison, in FIG. 2, the circuit 150 is communicatively connected to a silicon controller rectifier (SCR) 202, which itself is electrically connected to the fuse 108. When any of the sensors 140, 146, and 148 detect a voltage greater than a corresponding threshold voltage, the circuit 150 controls the SCR 202 to clear, or trip, the fuse 108. As such, power is completely removed from the power supply 100 in the embodiment of FIG. 2, including from the MOV 138 as well as the MOVs 140 and 142 and the capacitors 114 and 116. The MOVs 138, 140, and 142 are thus prevented from releasing sound, smoke, and/or smell, and from being damaged. Therefore, the advantage of the embodiment of FIG. 2 over the embodiment of FIG. 1 is that it is also useful when the sensor 144 senses that there is a (rectified) AC voltage greater than a (rectified) AC voltage threshold over the MOV 138.

Figure 3:
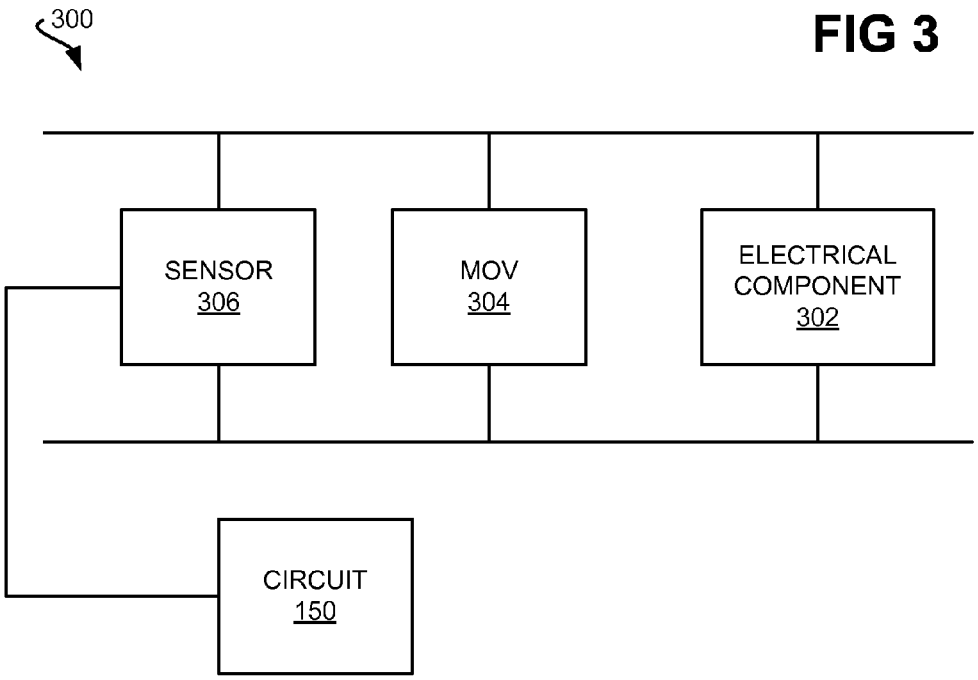
FIG. 3 is a diagram of a generalized system, according to an embodiment of the present invention.

FIG. 3 shows a generalized system 300, according to an embodiment of the invention. The system 300 may be a power supply, such as the power supply 100, in one embodiment. The system 300 includes an electrical component 302, a MOV 304, and a sensor 306 electrically connected in parallel to one another, as well as the circuit 150. The system 300 typically includes other components not depicted in FIG. 3. The electrical component 302 can be one of the capacitors 114 and 116 that have been described, an AC input, such as that formed by the line and neutral inputs 102 and 104 that has been described, or another type of electrical component. The MOV 304 can be the MOV 138, 140, or 142, or another MOV. The sensor 306 can be the sensor 144, 146, or 148, or another sensor.

The sensor 306 detects the voltage, either AC or DC, over the electrical component 302 and over the MOV 304. The circuit 150 removes power when the voltage detected by the sensor 306 exceeds a threshold voltage for a length of time greater than a threshold length of time. The circuit 150 may remove power from just the MOV 304 and the electrical component 302, or from the entire system 300. For instance, the circuit 150 may remove power as has been described in relation to FIG. 1, and/or as has been described in relation to FIG. 2.

Figure 4:
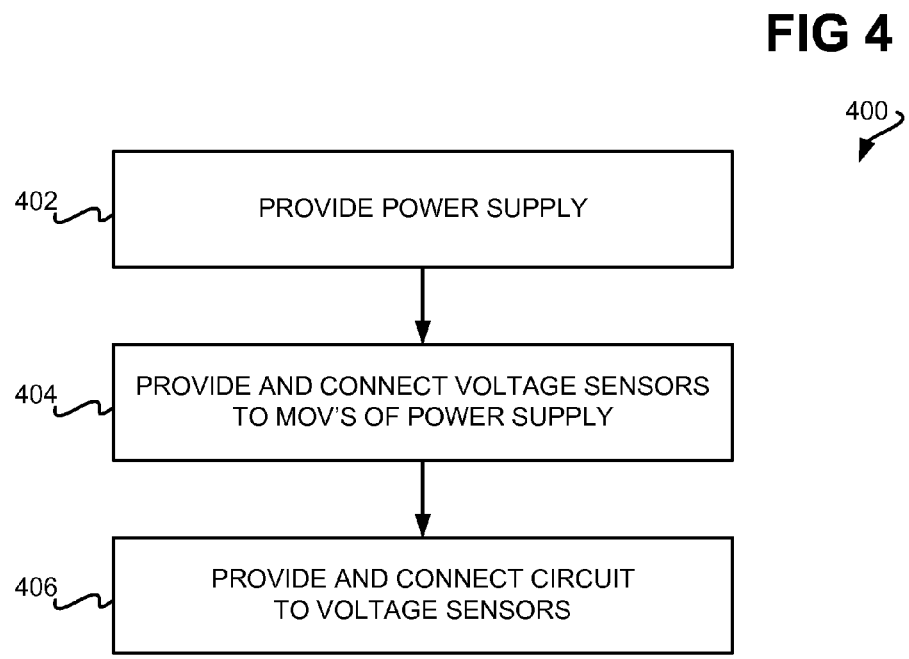
FIG. 4 is a flowchart of a method, according to an embodiment of the present invention.

In conclusion, FIG. 4 shows a method 400, according to an embodiment of the invention. The power supply 100 is provided (402). The power supply 100 has the circuit segment including the capacitors 114 and 116 in series, as well as the transformer 120, and one or more of the MOVs 138, 140, and 142. Sensors 144, 146, and/or 148 are provided, and connected to detect the voltage over corresponding electrical components (404), such as the capacitors 114 and/or 116 and the AC input made up of the line and the neutral inputs 102 and 104. The circuit 150 is further provided, and connected to the sensors 144, 146, and/or 148 (406), to remove power when the voltage detected by any of the sensors 144, 146, and/or 148 is greater than a threshold voltage for a length of time greater than a threshold length of time.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. An alternating current-to-direct current (AC-to-DC) power supply comprising:
   a circuit segment comprising a first capacitor and a second capacitor connected in series to receive a rectified AC voltage over the circuit segment;

a transformer having a first coil and a second coil, the first coil connected in parallel to the circuit segment, the second coil to provide a stepped-down voltage from the rectified AC voltage, the stepped-down voltage rectified and filtered to provide a DC output voltage of the AC-to-DC power supply;

a metal oxide varistor (MOV) connected in parallel to the first capacitor;

a voltage sensor to detect a DC voltage over the MOV and the first capacitor; and, a circuit to remove power in response to the voltage sensor detecting the DC voltage over the MOV and the first capacitor being greater than a threshold DC voltage for a length of time greater than a threshold length of time.

2. The AC-to-DC power supply of claim 1, wherein removing power prevents the MOV from releasing one or more of smoke, smell, and sound.

3. The AC-to-DC power supply of claim 1, further comprising a silicon controller rectifier (SCR) to be turned on to remove power,
wherein the circuit is to turn on the SCR in response to the voltage sensor detecting the DC voltage over the MOV and the first capacitor being greater than the threshold DC voltage for the length of time greater than the threshold length of time.

4. The AC-to-DC power supply of claim 3, further comprising a fuse that is cleared as a result of the SCR being turned on, such that clearing of the fuse results in removal of power.

5. The AC-to-DC power supply of claim 1, wherein the MOV is a first MOV, the voltage sensor is a first voltage sensor, the length of time is a first length of time, the threshold length of time is a first threshold length of time, and the AC-to-DC power supply further comprises:
an alternating current (AC) input to receive AC power;
a second MOV connected in parallel to the AC input; and,
a second voltage sensor to detect an AC voltage over the second MOV and the AC input,
wherein the circuit is to remove power in response to the second voltage sensor detecting the AC voltage over the second MOV and the AC input being greater than a threshold AC voltage for a second length of time greater than a second threshold length of time,
and wherein removing power protects the MOV from being damaged by the AC voltage greater than the threshold AC voltage.

6. The AC-to-DC power supply of claim 1, further comprising a transistor connected to the first coil and to normally be turned on and off in a pulse-width modulated manner for the AC-to-DC power supply to provide the DC output voltage, the transistor being turned on for a predetermined length of time to remove power,
wherein the circuit is to turn on the transistor for at least a predetermined length of time in response to the voltage sensor detecting the DC voltage over the MOV and the capacitor being greater than the threshold DC voltage for the length of time greater than the threshold length of time.

7. The AC-to-DC power supply of claim 1, wherein the MOV is a first MOV, the voltage sensor is a first voltage sensor, the length of time is a first length of time, and the AC-to-DC power supply further comprises:
a second MOV connected in parallel to the second capacitor; and,
a second voltage sensor to detect a DC voltage over the second MOV and the second capacitor,
wherein the circuit is to remove power in response to the second voltage sensor detecting the DC voltage over the second MOV and the second capacitor being greater than the threshold DC voltage for a second length of time greater than the threshold length of time,
and wherein removing power prevents the second MOV from releasing one or more of smoke, smell, and sound.

8. A system comprising:
an electrical component;
a metal oxide varistor (MOV) connected in parallel to the electrical component;
a voltage sensor to detect a voltage over the MOV and the electrical component; and,
a circuit to remove power in response to the voltage sensor detecting the voltage over the MOV and the electrical component being greater than a threshold voltage for a length of time greater than a threshold length of time,
wherein the electrical component is a capacitor, such that upon the capacitor wearing out, the voltage over the MOV and the capacitor exceeds a rated voltage of the capacitor, such that the MOV vents the capacitor to protect the capacitor, but such that the MOV begins to one or more of smoke, smell, and sound when the voltage over the capacitor exceeds the rated voltage by more than a given length of time.

9. The system of claim 8, wherein the system is a power supply, and the electrical component is a capacitor.

10. The system of claim 8, wherein the MOV is a first MOV, the voltage sensor is a first voltage sensor, the length of time is a first length of time, the threshold length of time is a first threshold length of time, and the system further comprises:
an alternating current (AC) input to receive AC power;
a second MOV connected in parallel to the AC input; and,
a second voltage sensor to detect an AC voltage over the second MOV and the AC input,
wherein the circuit is to remove power in response to the second voltage sensor detecting the AC voltage over the second MOV and the AC input being greater than a threshold AC voltage for a second length of time greater than a second threshold length of time,
and wherein removing power protects the MOV from being damaged by the AC voltage greater than the threshold AC voltage.

11. The system of claim 8, further comprising a transistor to be turned on to remove power,
wherein the circuit is to turn on the transistor in response to the voltage sensor detecting the voltage over the MOV and the electrical component being greater than the threshold voltage for the length of time greater than the threshold length of time.

12. The system of claim 11, wherein the transistor is normally turned on and off in a pulse-width modulated manner, and is turned on for a predetermined length of time to remove,
wherein the circuit is to turn on the transistor for at least the predetermined length of time in response to the voltage sensor detecting the voltage over the MOV and the electrical being greater than the threshold voltage for the length of time greater than the threshold length of time.

13. The system of claim 8, further comprising a silicon controller rectifier (SCR) to be turned on to remove power from the electrical component and the MOV,
wherein the circuit is to turn on the SCR in response to the voltage sensor detecting the voltage over the MOV and the electrical component being greater than the threshold voltage for the length of time greater than the threshold length of time.

14. The system of claim 13, further comprising a fuse that is cleared as a result of the SCR being turned on, such that clearing of the fuse results in removal of power.

15. A method comprising:
providing an alternating current-to-direct current (AC-to-DC) power supply having:
  a circuit segment comprising a first capacitor and a second capacitor connected in series to receive a rectified AC voltage over the circuit segment;
  a transformer having a first coil and a second coil, the first coil connected in parallel to the circuit segment, the second coil to provide a stepped-down voltage from the rectified AC voltage, the stepped-down voltage rectified and filtered to provide a DC output voltage of the AC-to-DC power supply; and,
  a metal oxide varistor (MOV) connected in parallel to the first capacitor;
providing a voltage sensor to detect a DC voltage over the MOV and the first capacitor; and,
providing a circuit to remove power in response to the voltage sensor detecting the DC voltage over the MOV and the first capacitor being greater than a threshold DC voltage for a length of time greater than a threshold length of time.

16. The method of claim 15, wherein the MOV is a first MOV, the voltage sensor is a first voltage sensor, the length of time is a first length of time, the AC-to-DC power supply further has a second MOV connected in parallel to the second capacitor, and the method further comprises providing a second voltage sensor to detect a DC voltage over the second MOV and the second capacitor,
wherein the circuit is to remove power in response to the second voltage sensor detecting the DC voltage over the second MOV and the second capacitor being greater than the threshold DC voltage for a second length of time greater than the threshold length of time,
and wherein removing power prevents the second MOV from releasing one or more of smoke, smell, and sound.

17. The method of claim 16, wherein the threshold length of time is a first threshold length of time, the AC-to-DC power supply further comprises an alternating current (AC) input to receive AC power and a third MOV connected in parallel to the AC input, and the method further comprises providing a third voltage sensor to detect an AC voltage over the third MOV and the AC input,
wherein the circuit is to remove power in response to the third voltage sensor detecting the AC voltage over the third MOV and the AC input being greater than a threshold AC voltage for a third length of time greater than a second threshold length of time,
and wherein removing power protects the MOV from being damaged by the AC voltage greater than the threshold AC voltage.

18. The method of claim 15, wherein upon the first capacitor wearing out, the DC voltage over the MOV and the first capacitor exceeds a rated DC voltage of the first capacitor, such that the MOV vents the first capacitor to protect the first capacitor, but such that the MOV begins to one or more of smoke, smell, and sound when the DC voltage over the first capacitor exceeds the rated DC voltage by more than a given length of time.

* * * * *